(No Model.)
J. FLIETNER.
FIRE ESCAPE.
No. 330,103.    Patented Nov. 10, 1885.
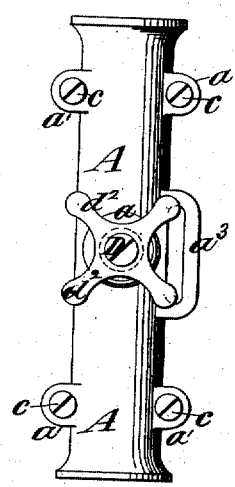
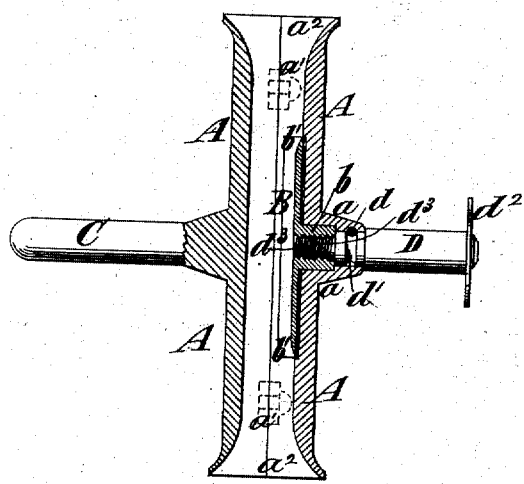
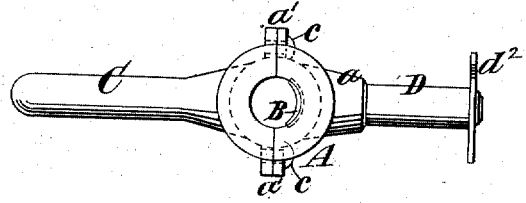
Witnesses.                                    Inventor:

UNITED STATES PATENT OFFICE.

JOHN FLIETNER, OF BROOKLYN, NEW YORK.

FIRE-ESCAPE.

SPECIFICATION forming part of Letters Patent No. 330,103, dated November 10, 1885.

Application filed July 15, 1885. Serial No. 171,681. (No model.)

*To all whom it may concern:*

Be it known that I, JOHN FLIETNER, of the city of Brooklyn, (Green Point,) in the county of Kings and State of New York, have invented a new and useful Improvement in Fire-Escapes, of which the following is a specification.

My invention relates to that class of fire-escapes which is adapted to be secured to the person, and to travel along a cable or rope suspended from a building, and which comprises a tube or sleeve through which the rope is received, and a brake-shoe capable of operation by the hand of the person making the descent, and by which the speed of descent may be controlled.

The invention consists in novel details of construction and combinations of parts, which are hereinafter referred to, and particularly pointed out in the claim.

In the accompanying drawings, Figure 1 is a longitudinal section of my improved appliance. Fig. 2 is an elevation, looking from the right hand of Fig. 1, and Fig. 3 is a plan thereof.

Similar letters of reference designate corresponding parts in all the figures.

The cable or rope with which this appliance is to be used may be an ordinary cable or rope of hemp, wire, or other material, and may be kept ready for use with the appliance upon it, so that in case of a fire the cable or rope may be quickly secured at one end in or to the building, and then thrown from the window, so as to depend therefrom to the ground.

The appliance consists, essentially, of a sleeve or tube, A, a brake-shoe, B, arranged therein and adjustable relatively thereto, and handles C D at opposite sides of the sleeve or tube. The brake-shoe may be of considerable length, so as to extend for some distance lengthwise of the sleeve or tube, and it is curved or of arc shape transversely, so as to fit upon a rope or cable. It has at the outer side a hub or boss, $b$, which extends into a socket or bearing, $a$, formed in the sleeve or tube A. The sleeve or tube A is represented as made in two longitudinal sections, in order to provide for placing the shoe B therein, and its two parts are secured together by screws or bolts $c$, inserted through lugs or ears $a'$, provided on its two parts. The bore of the sleeve or tube A is represented as slightly flaring at the ends, as shown at $a^2$, in order to avoid catching upon and abrasion of the cable or rope, and the brake-shoe has its inner surface slightly rounded or flared at the ends for a like purpose, as shown at $b'$. The sleeve or tube A may be of cast or forged metal, and the handle C may be made integral with one of the parts or sections thereof. The handle D consists of a spindle or shaft journaled in the hub or bearing $a$, and therein secured against lengthwise movement by a pin or key, $d$, inserted transversely to the spindle and entering a groove, $d'$, therein. This rotary handle or spindle has at the outer end a wheel or projections, $d^2$, whereby a better hold of the hand may be obtained, and has at the inner end a screw-thread, $d^3$, which engages a nut formed in the hub $b$ on the brake-shoe B. This thread may be, and preferably is, a left-hand thread, as the turning of the handle D may be most naturally done toward the right, and will then press the brake-shoe B against the cable or rope.

As shown clearly in Fig. 2, the sleeve or tube A has upon its side a loop, $a^3$, through which a strap or belt may be passed, and by which the appliance may be securely fastened to a belt encircling the waist of a person desiring to descend.

When the appliance is to be used, the handle D is first turned to press the brake-shoe B so forcibly against the cable or rope as to prevent any sliding movement of the appliance thereon. The belt is then strapped about the waist, and the person may then safely trust himself to the support afforded by the appliance. By taking hold of both handles with his hands he is enabled to steady himself and maintain his upright position, and by turning the handle D slightly he can regulate at will the speed of his descent along the cable or rope.

What I claim as my invention, and desire to secure by Letters Patent, is—

The combination, with the divided tube or sleeve A, composed of semi-cylindric sections provided with lugs or ears $a'$ and transverse bolts $c$, inserted through said lugs or ears for securing the sections together, of the tube or sleeve having at one side the hub *a* of the brake-shoe B, having an outwardly-projecting hub, *b*, and a handle, D, journaled
5 and held against lengthwise movement in the hub *a* of the tube or sleeve, and having a screw-thread engaging a nut in the hub *b* of the brake-shoe, substantially as herein described.

JOHN FLIETNER.

Witnesses:
C. HALL,
FREDK. HAYNES.

It is hereby certified that in Letters Patent No. 330,103, granted November 10, 1885, upon the application of John Flietner, of Brooklyn, New York, for an improvement in "Fire Escapes," errors appear in the printed specification requiring correction as follows: In line 1, page 2, the word "of" should be stricken out and in line 2, same page, a comma should be inserted after the reference letter "a;" and that the said Letters Patent should be read with this correction therein that the same may conform to the record of the case in the Patent Office.

Signed, countersigned, and sealed this 17th day of November, A. D. 1885.

[SEAL.]

H. L. MULDROW,
*Acting Secretary of the Interior.*

Countersigned:
   M. V. MONTGOMERY,
      *Commissioner of Patents.*